United States Patent [19]
Brosh et al.

[11] Patent Number: 4,658,153
[45] Date of Patent: Apr. 14, 1987

[54] PLANAR COIL APPARATUS FOR PROVIDING A FREQUENCY OUTPUT VS. POSITION

[76] Inventors: Amnon Brosh, 16 Sunnyside Dr., Montvale, N.J. 07645; David Fiori, Jr., 140 Dollington Rd., Yardley, Pa. 19047

[21] Appl. No.: 864,737
[22] Filed: May 12, 1986

Related U.S. Application Data

[63] Continuation of Ser. No. 621,997, Jun. 18, 1984, abandoned.

[51] Int. Cl.⁴ ............................................. H01H 36/00
[52] U.S. Cl. .................................... 307/106; 361/179; 307/116; 340/686
[58] Field of Search ....................... 307/116, 106, 108; 361/179–181; 336/73, 75, 79, 115–120; 340/547, 551, 561, 600, 686; 331/65, 66

[56] References Cited

U.S. PATENT DOCUMENTS

| | | | |
|---|---|---|---|
| 3,469,204 | 9/1969 | Magyar et al. ....................... | 307/116 |
| 3,757,245 | 9/1973 | Berger ................................... | 331/66 |
| 3,758,845 | 9/1973 | Mackelvie et al. ............. | 336/120 X |
| 4,148,008 | 4/1979 | Lask et al. ....................... | 307/116 X |
| 4,425,511 | 1/1984 | Brosh ................................... | 307/106 |
| 4,482,816 | 11/1984 | Richardson et al. ............... | 307/106 |

*Primary Examiner*—A. D. Pellinen
*Assistant Examiner*—T. DeBoer
*Attorney, Agent, or Firm*—Arthur L. Plevy

[57] ABSTRACT

The position sensor constitutes a fixed planar board having disposed on the surface serpentine coil structures of relatively low resistance and inductance. The coils are driven in a resonance mode which provides a frequency output according to the position of a moving planar member. The second movable planar board has disposed on the surface thereof planar loop coil structures. The second board is moved in proximity to the first board to vary the resonance characteristics of the first coil according to the position of the second board with respect to the fixed board. In this manner the frequency output of the system is a function of the position of the boards with respect to one another. Other embodiments depict means for compensating the thermal drifts of the frequency with respect to temperature.

16 Claims, 13 Drawing Figures

PLANAR COIL APPARATUS FOR PROVIDING A FREQUENCY OUTPUT VS. POSITION

This is a continuation of application Ser. No. 06/621,997 filed 6/18/84, now abandoned.

BACKGROUND OF THE INVENTION

This invention relates to operating of low inductance planar coil structures in a variable frequency mode and more particularly to apparatus for providing a frequency output according to the position or movement of a movable board member with respect to a stationary board member.

There is a need for apparatus which will provide an output signal as a function of the position of one member with respect to another. Such apparatus is therefore able to detect motion, movement or position of the one member with respect to the other.

An example of such a position sensor is shown in U.S. Pat. No. 4,425,511 issued on Jan. 10, 1984 and entitled PLANAR COIL APPARATUS EMPLOYING A STATIONARY AND MOVABLE BOARD by A. Brosh, the inventor herein.

This patent shows means for employing planar coils, positioned on a stationary board, and a closed loop coil, positioned on a moving board, in order to obtain an output signal which is indicative of the movement between the stationary and the moving board.

A further variation of the same technology is used to provide simple and cost effective means for obtaining an output signal where the frequency of the signal is indicative of the movement between the stationary and moving board. The ability to develop a frequency output vs. position is desirable in many applications since, unlike variable amplitude mode of operation, no demodulation and analog to digital signal conversion are required in order to make the output compatible with digital system and microcomputers.

It is, therefore, an object of the present invention to provide apparatus exhibiting a variable frequency output which output varies according to the position of one member with respect to another.

BRIEF DESCRIPTION OF THE PREFERRED EMBODIMENT

Apparatus for providing an output signal indicative of a movement between at least a first and second position comprising a first stationary planar member having disposed on a first surface thereof a flat serpentine coil structure with said coil having output terminals, an oscillator circuit coupled to said output terminal of said coil and operative to provide an output frequency according to the magnitude of the inductance of said coil, a second movable planar member having disposed on a surface thereof a closed loop coil structure, means for moving said second planar member with respect to said first planar member to modulate the equivalent inductance of said coil structure and to thereby vary the frequency of said oscillator in accordance with the position of said second member with respect to said first member.

DETAILED DESCRIPTION OF THE FIGURES

Figure 1:
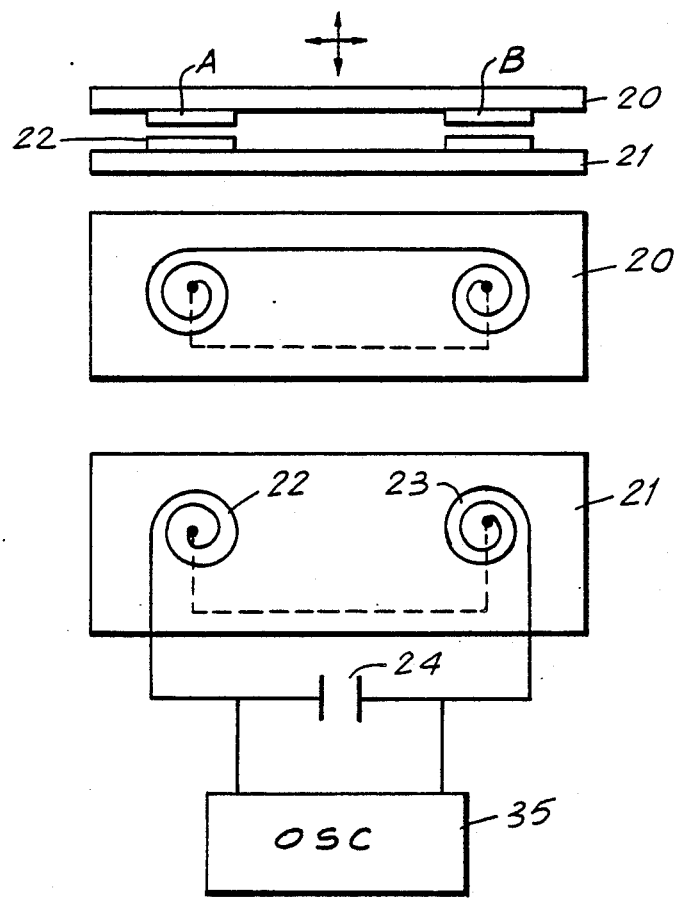
FIG. 1 is a schematic view of a motion sensor employing a variable frequency output.

Referring to FIG. 1, there is shown a motion sensor 10 operating according to the principles of this invention.

A top planar member 20 has a double spiral planar coil configuration 12 deposited on the top surface comprising a first coil A and a second coil B. Essentially, the planar member 20 is a printed circuit board and employs conventional printed circuit materials, such as glass, cloth, Teflon, or a paper base phenolic composition. It is, of course, understood that any of the many materials can be employed for circuit board 20 as presently used to fabricate conventional printed circuit boards, thick and thin film circuits, etc.

Planar coil structures are defined as flat serpentine coils which are deposited on relatively thin flat boards such as printed circuit boards, ceramic substrates, etc. by means of printing, vacuum deposition, etc. using photolithographic techniques. They do not constitute the so-called solenoid construction which is clearly not planar. They do not employ magnetic cores or yokes and do not depend on magnetic coupling via ferrogmagnetic members. The magnetic coupling in planar coil position sensors, which are the subject of this invention, takes place through an air gap. Due to the relatively large surface areas of the planar coil structures, the magnetic field coupling through air between the planar coils appears to be the most effective way to couple coils which are flat, or planar, rather than three dimensional. Air coupling not only results in simpler structures but also eliminates the relatively large thermal errors of coils which are coupled using ferromagnetic materials due to the large changes of the permeability with temperature.

Planar printed coils, however, are different from conventional coil structures in that they are characterized by relatively low resistance and inductances. This invention provides a technique for driving the planar coil structures at relatively high frequencies in a resonance mode, which greatly enhances the impedances of the coils. The invention also provides means for obtaining monotonic and linear output versus displacement for the printed planar coils. Further, simple schemes are shown for attaining thermal compensation of the frequency output.

The coil configuration 12 comprising coils A and B is etched, stamped, printed or plated on the planar base member 20 and a suitable conductor material such as copper is employed according to printed circuit techniques. The coil configuration depicted consists of a first coil A and second coil B with each terminal connected together to form a parallel or closed loop coil structure. While two coils are shown, it is understood that two additional coils can be emplaced on the underside of the board and connections between the coil terminals can be made on the underside of the board via plated through holes.

The board 20, as will be explained, is movable with respect to a stationary board 21. The board 21 is also fabricated from suitable printed circuit substrate material and has deposited thereon two coils 22 and 23. These two coils are connected to a capacitor 24 and oscillator circuit 25 as shown.

As top board 20 is moved into the vicinity of the bottom or stationary board 21, coupling between coil 22 and coil A of board 20 increases thus inducing a stronger current in the closed loop coils A and B of configuration 12. The induced current which flows in coil A and B creates a field which is coupled to coils 22 and 23 located on the stationary board 21. Since this field is opposing the main field, the resulting effect is to decrease the equivalent inductance of coils 22 and 23 as the moving board 20 moves with respect to the stationary board 21.

Figure 2A:
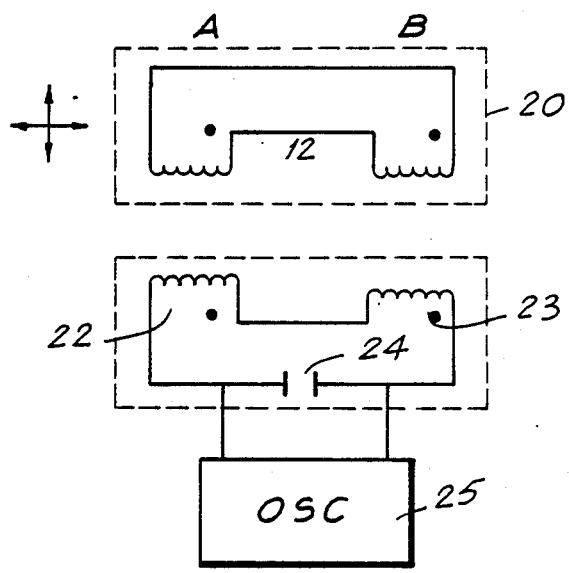
FIGS. 2a and b are a diagrammatic view of the motion sensor of FIG. 1.
Figure 2B:
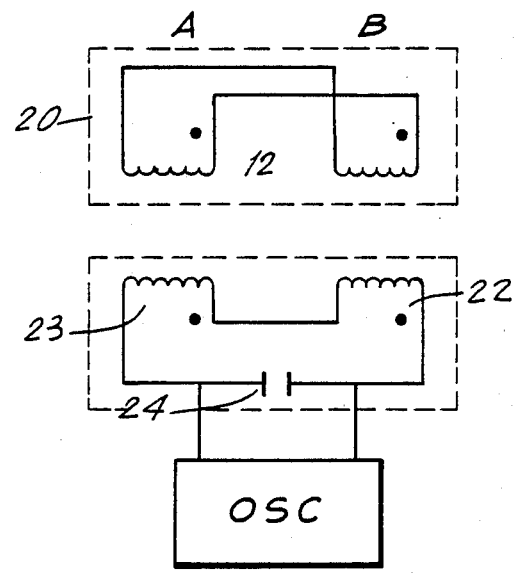

The induced current in the closed loop coil structure 12 may be made to increase or decrease, as the coupling between boards 20 and 21 increases, depending on whether coils A and B are connected aiding, as in FIG. 2A, or opposing as in FIG. 2B. The same effect can also be achieved by connecting coils 22 and 23 opposing each other. The ability to obtain opposing effects by use of the closed loop technique is very useful in the design of position sensors.

It is clear that at the coupling between coils 22 and 23 is varied due to the motion of the moving board 20, the combined equivalent inductance varies. When the coils are connected to a capacitance 24 and serve as a tank circuit of an oscillator 25, the frequency of such an oscillator will vary directly as a function of the position of the moving board 20 with respect to stationary board 21. The oscillator 25, as is understood, may be any one of numerous circuit configurations as any oscillator configuration will operate with the tank circuit described above.

As can be seen, the moving board 20 has no leads connected to an external circuit. This is an important consideration since the moving board is often a part of position sensing device which is subjected to many cycles of operation. The presence of leads attached to the moving board would have hindered the motion as well as create reliability problems due to wire fatigue.

Figure 3A:
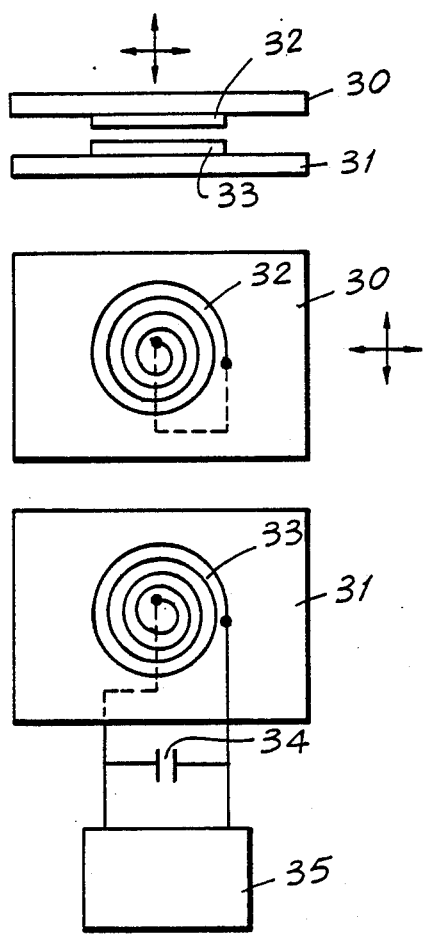
FIGS. 3a and b are a schematic view of another embodiment of a motion sensor.
Figure 3B:
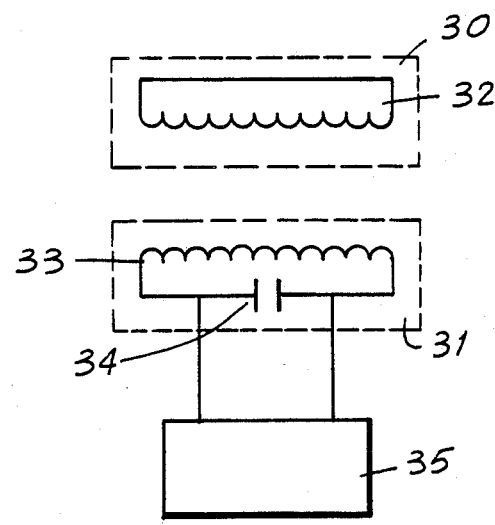
Figure 4A:
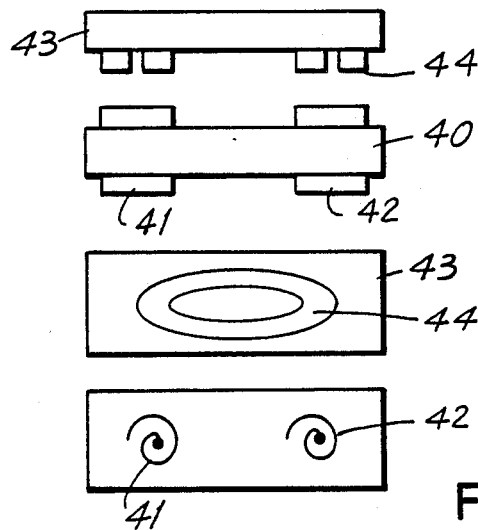
FIG. 4a is a side view of a coil configuration used in a motion sensor.
Figure 4B:
FIG. 4b is a top plan view of the coil configuration.
Figure 4C:
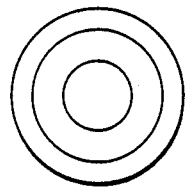
FIG. 4c is a top plan view of an alternate embodiment of a coil configuration.

Another scheme which employs a closed loop coil moving board with no external lead connections is shown in FIG. 3. Using a single closed loop coil 32 on moving board 30 and a single coil 33 on stationary coil 31, a similar effect is achieved. Coil 33 in conjunction with capacitor 34 comprises a tank circuit for oscillator 35. As moving board 30 is moved with respect to stationary board 31, the magnetic field induced in coil 32 creates a reaction magnetic field in coil 33 due to the current flowing in the shorted coil 32. This induced field serves to modulate the inductance of coil 33 as a function of the position of board 30. In this case, however, the equivalent inductance can only be decreased as coupling increases. The shorted closed loop coils can also be achieved by using closed loop single turns as shown in FIGS. 4B and 4C.

Referring now back to FIGS. 1 and 3, it is shown that the system will provide an output when the moving boards 20 and 30 are moved in two different modes with respect to stationary boards 21 and 31. The first mode of displacement is indicated by vertical arrows. They signify movement of the moving boards away from and closer to the stationary boards serving to increase and decrease the spacing between the board and thus the coils. We will refer to this motion as perpendicular motion. The second mode is indicated by horizontal arrows. They signify a sideways movement of the moving board with respect to the stationary board serving to increase and decrease the overlap between the boards and thus the coils. We will refer to this motion as parallel motion.

In general, the perpendicular motion of the moving board will result with a frequency output versus displacement which is smooth, monotonic and non-linear. This is due to the fact that in the perpendicular motion, the moving coils and stationary coils always overlap and only the distance, or gap, between them is modulated. Hence, the frequency output characteristics depend strongly on the propagation characteristics of the magnetic field in air, which are monotonic and non-linear with distance. Whenever linear output of the frequency versus displacement is required, a linearization alogrithmn may be employed in the digital signal conditioning circuit.

The parallel motion, on the other hand, may create an unsmooth frequency output versus displacement while the overlap between the planar coil structures is changing. The reason for this is that the planar coils are constructed of spiral structures consisting of printed lines. Hence, since line thicknesses and spacings have finite values, two coils constructed in such a manner when moved in parallel with respect to each other, their magnetic coupling will be affected when the coil lines of one coil cross over lines of the other coil. Therefore, care must be taken in the design of planar coil position sensors, to avoid the cross-over areas.

Figure 5:
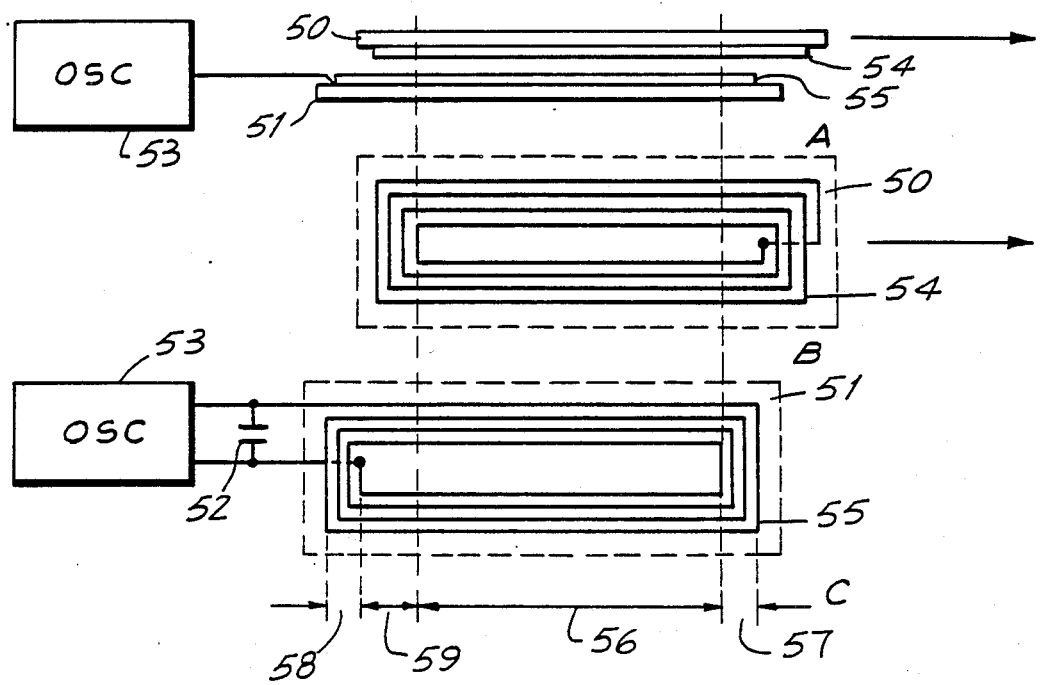
FIGS. 5a, 5b and 5c depict a side, top and a circuit schematic of a planar coil apparatus according to this invention.

A typical arrangement for obtaining a smooth output is shown in FIG. 5. Moving board 50 with planar coil 54 is moved parallel to stationary board 51 with coil 55. Coils 54 and 55 are rectangular with the side in the direction of the desired displacement being long enough to accommodate the full scale displacement range 56 plus the cross over areas 57 and 58 of coil 55 plus the cross over area 59 of coil 54. As can be seen from FIG. 5, moving board 50 can move to the right the full distance of the full scale displacement range 56 without crossing over any lines.

Figure 6:
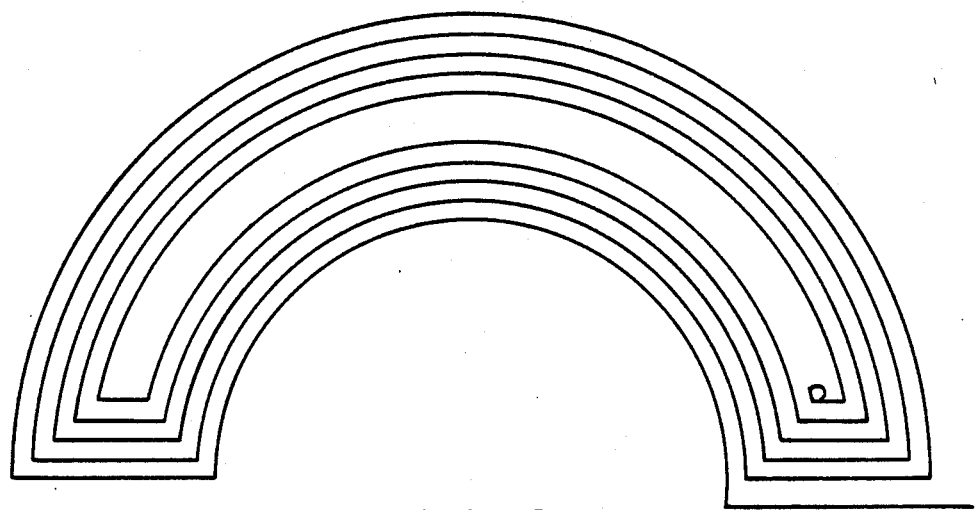
FIG. 6 is a top plan view of a particular coil configuration.
Figure 7:
FIG. 7 is a top plan view of an alternate coil configuration.

The same approach can be used for position sensors, operated in parallel motion mode, which employ the two coil per board combination shown in FIG. 1. Further, for angular motion rotary position sensors, the rectangular coils will take a circular form as shown in FIG. 6. Avoiding the cross over areas while operating the coil structures in parallel motion will provide a smooth, monotonic frequency output versus displacement. However, the output may not necessarily be linear. Since the resonant frequency of a tank circuit is inversely proportional to the square root of the inductance, the inductance must vary in a non-linear fashion versus displacement in order to achieve a linear relationship versus frequency. The rectangular coil structures shown in FIG. 5 and FIG. 6, will tend to provide a linear inductance variation. Hence certain adjustments must be made in the geometry of these coils in order to modify the inductance versus position characteristics in order to provide a linear frequency output. A typical coil structure is shown in FIG. 7 which provides a linear frequency output versus displacement.

When operating the planar position sensor in a resonance mode in conjunction with an oscillator as shown in FIGS. 1, 2, and 3, certain thermal errors are observed. As stated earlier, due to the absence of temperature sensitive ferromagnetic materials, such as cores, in the planar sensor path, the thermal errors are relatively low. The source of the errors is the change in resistance of the conductors used for the printing of the spiral coils as well as the thermal effects on the losses in the Q of the tank and in the oscillator. Data indicates that the thermal coefficient of the frequency output is normally negative with increase in temperature and its magnitude is a function of the degree of coupling between the static and moving board. This means that the thermal error, for the same temperature, varies with displacement with the highest error occuring when the coils are at maximum coupling and diminishing in value as coupling decreases.

Figure 8:
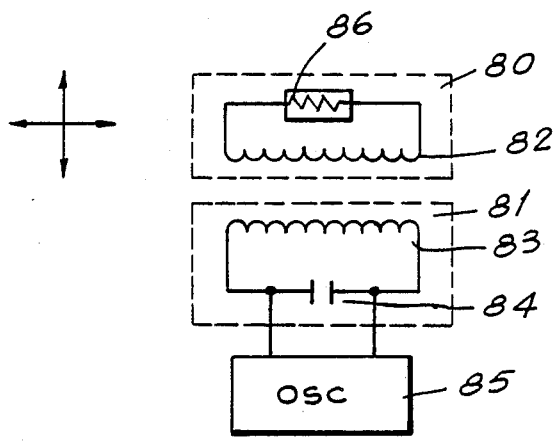
FIG. 8 is a simple schematic diagram of a position sensor employing thermal compensation.

A simple arrangement for compensating for the thermal errors is shown in FIG. 8. Basically, FIG. 8 utilizes the sensing approach shown in FIGS. 3A and 3B. The difference is that the loop of coil 82 is closed through a relatively low value thermistor 86 with a positive coefficient of resistance versus temperature.

The arrangement will result in an increase in the closed loop current of coil 82 as the temperature increases due to the reduction in the resistance of thermistor 86. The increase in the current in coil 82, will increase the reaction magnetic field induced back in oscillator coil 83, resulting in a reduction of the equivalent inductance of this coil and hence an increase in the frequency of oscillator 85. Thermistor 86 can be selected for value and temperature coefficient to provide optimal compensation for the thermal errors of the output frequency. Since coil 82, with its compensating thermistor 86 are mounted on the moving board 80, the thermal compensation effects of thermistor 86 are a function of position. The increase in the loop current, due to the thermistor, will have its greatest effect when the coils are at maximum coupling and diminish as the coupling decreases, which is ideally suited for compensating the thermal errors.

Since the device shown in FIGS. 1 and 2 also utilize closed loop currents, the thermistor approach can be employed in exactly the same manner to obtain thermal compensation of these devices.

Figure 9:
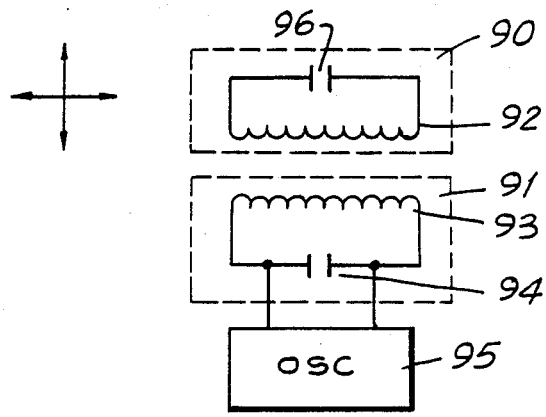
FIG. 9 is a schematic diagram of an alternate embodiment of a position sensor.

Another method for enhancing the temperature performance of planar coil position sensors is shown in FIG. 9. In this case, coil 92 on moving board 90, is connected to capacitor 96 which is of similar value as capacitor 94 connected across coil 96 on the static board 91. The frequency resonance characteristics of the static and moving coils are similar and, as a result, the currents flowing in the coil 92 and capacitor 96 combination, due to the magnetic coupling from the static coil 93, are greatly reduced becuase of the high impedance of the resonant circuit. Therefore, the reaction magnetic field produced by coil 92 is negligible even when the two coils are closely coupled.

This then eliminates the loading effect, which would have taken place resulting in the deterioration of the Q of the oscillator resonant circuit (coil 93 and capacitor 94). Hence the thermal losses, due to coil loss at close coupling, decrease substantially. Frequency modulation, as a function of the displacement of the moving coil, occurs due to the principle of the transformer coupling of capacitor 96 into the oscillator resonant circuit via coil 93 and 92. Since the coupling between coils 93 and 92 varies with the position of the moving coil 90, the magnitude of capacitance 96 coupled to the oscillator tank varies. As a result, the oscillator frequency will depend on the moving board position. As before, the same approach can also be used in such devices as the one shown in FIGS. 1 and 2.

We claim:

1. Apparatus for providing an output signal indicative of a movement between at least a first and second position, comprising:
   (a) a first stationary planar member having disposed on a first surface thereof a flat serpentine coil structure with said coil having output terminals,
   (b) an oscillator circuit coupled to said output terminal of said coil and operative to provide an output frequency said oscillator including a capacitor which capacitor forms a resonant circuit with said coil to provide said output frequency from said oscillator which frequency varies according to the magnitude of the inductance of said coil,
   (c) a second movable planar member having disposed on a surface thereof a closed loop coil structure,
   (d) means for moving said second planar member with respect to said first planar member, modulating the equivalent inductance of said coil structure and to thereby vary the resonant frequency of said oscillator in accordance with the position of said second member with respect to said first member, to cause said oscillator to provide said output frequency which varies monotonically and continuously in accordance with the position of said second member with respect to said first member.

2. The apparatus according to claim 1 wherein said flat serpentine coil structure on said first planar member comprises first and second coil structures disposed on said surface and connected in series.

3. The Apparatus according to claim 2, wherein said first and second coils are connected in series aiding, to cause said equivalent inductance to increase as said second movable member is moved closer to said first member.

4. The apparatus according to claim 2, wherein said first and second coils are connected in series opposing, to cause said equivalent inductance to decrease as said second movable member is moved closer to said first member.

5. The apparatus according to claim 1 wherein said closed loop structure comprises a single loop of conductor.

6. The apparatus according to claim 5 wherein said closed loop strucure includes a series thermistor device to provide a compensated frequency output versus temperature.

7. The apparatrus according to claim 1 wherein said closed loop coil structure comprises two coils connected in a series loop.

8. The apparatus according to claim 7 where said two coils are connected in series aiding to cause such equivalent inductance to increase as said second movable planar member is moved closer to said stationary planar member.

9. The apparatus according to claim 7 wherein said two coils are connected in series opposing to cause said equivalent inductance to decrease as said second planar member is moved closer to said stationary planar member.

10. The apparatus according to claim 1 wherein said flat serpentine coil structure is a rectangular coil configuration having extended parallel paths in the horizontal direction and shorter parallel paths in the vertical direction.

11. The apparatus according to claim 10, wherein said closed loop coil structure is a rectangular closed coil structure.

12. The apparatus according to claim 1 wherein said flat serpentine coil is of a semicircular configuration.

13. The apparatus according to claim 1 wherein said first planar member is a printed circuit board having disposed thereon a printed circuit serpentine coil configuration.

14. The apparatus according to claim 1 wherein said first and second planar members are relatively congruent.

15. The apparatus according to claim 1 further including a capacitor in series with said closed loop coil structure.

16. The apparatus according to claim 1 further including a thermistor in series with said closed loop structure.

* * * * *